United States Patent [19]

Gerrity et al.

[11] 4,017,718
[45] Apr. 12, 1977

[54] ALTITUDE CONTROL SYSTEM FOR DRONES

[75] Inventors: Robert John Gerrity, Canoga Park; Clarence Dwight Wandrey, Thousand Oaks, both of Calif.; Benjamin Howard Dolbin, deceased, late of Newbury Park, Calif., by Arlene M. Dolbin Rossi, executor

[73] Assignee: Lear Siegler, Inc., Santa Monica, Calif.

[22] Filed: Feb. 9, 1976

[21] Appl. No.: 656,703

[52] U.S. Cl. .................... 235/150.2; 235/150.22
[51] Int. Cl.² .................. G06G 7/22; G06G 7/78
[58] Field of Search .................. 235/150.2, 150.22

[56] References Cited

UNITED STATES PATENTS 3,519,806   7/1970   Lami et al. .................. 235/150.22

Primary Examiner—R. Stephen Dildine, Jr.
Attorney, Agent, or Firm:—Ralph B. Pastoriza

[57] ABSTRACT

An approximation is made in the equation for the desired vertical profile command signal to control the altitude of a drone traveling towards a target such that simple analog circuitry may be utilized instead of complicated computers.

2 Claims, 2 Drawing Figures $hp = Y \tan A1$
$Y \approx R - C$
$hp \approx (R-C) \tan A1$ when $C = 0$
$hp = R \sin A2$ For $C > 0$, $\tan A1$
For $C = 0$, $\sin A2$

ALTITUDE CONTROL SYSTEM FOR DRONES

This invention relates generally to automatic flight controls for drones and more particularly to a simplified method and system for generating a vertical profile command signal to control the altitude of a drone traveling towards a target.

BACKGROUND OF THE INVENTION

In military training maneuvers, drones are used to simulate enemy missiles closing in on a target. The drones themselves are programmed to follow various flight paths and in themselves constitute targets for the testing of missile defense systems.

One of the important functions programmed into the drone is a vertical profile of the path of travel of the drone towards a particular target. The vertical descent profile programmed is actually a continuously varying altitude command which is a function of the slant angle to the target.

A first type of vertical profile of the drone altitude might include a descent from a given altitude to a low altitude and thence a horizontal straight line low altitude approach directly to the target. A second type of vertical profile might simply be a straight line approach directly to the target from a given altitude, the drone traveling along the line of the slant range directly to the target.

To generate the foregoing types of altitude profiles for the drone, a computer is normally provided on the drone which will generate the necessary command altitudes as a function of slant range to the target. The slant range to the target is obtained from a standard TACAN receiver aboard the drone. The TACAN receiver is tuned to the target's TACAN transmitter frequency. The presently known methods of carrying out the altitude profile computation involve costly alternatives. Two such methods would be to store the required profile in a digital computer core memory or compute the profile equations as a function of range in a digital processor. Both arrangements would require a digital computer.

The primary disadvantage of the foregoing arrangement is the requirement of the digital computer itself. Not only is the computer costly, but adds substantially to the weight, volume and power requirements of the drone.

BRIEF DESCRIPTION OF THE PRESENT INVENTION

Bearing the foregoing in mind, the present invention permits the use of relatively simple analog computation techniques to the end that a digital computer can be avoided for generating an acceptable vertical mission profile command signal. The use of such simple analog components is a result of a simplifying assumption in the vertical profile equations.

Thus, the method of providing a vertical profile command signal for a drone at a given slant range R from a target wherein the drone is to decrease in altitude and then make a low altitude horizontal approach when the target range reaches a value C, includes the steps of, first generating a varying analog signal directly proportional to R. A constant analog signal is then generated directly proportional to C. The C signal is subtracted from the R signal to provide a difference signal. In the last step of the method, this difference signal is multiplied by a given constant equal to the tangent of the angle of approach of the drone to the point where R=C. In the event the mission profile is a straight in approach along the slant range, the value of C is zero and the given constant is then equal to the sine of the angle of approach of the slant range of the drone to the target.

Apparatus for carrying out the method includes a simple digital to analog converter to provide a varying analog signal proportional to the range R, a first potentiometer to provide a constant analog signal proportional to the value C, a difference circuit means for providing an analog signal proportional to R-C, and a second potentiometer across which the difference signal appears for selecting a fraction of this signal defined by the tangent of the angle of approach of the drone to the point where R=C, or, in the event of a straight in approach, the sine of the angle of approach of the slant range of the drone to the target. Since the angles in both instances are constants, the simple potentiometer device may be used.

BRIEF DESCRIPTION OF THE DRAWINGS

A better understanding of this invention will be had by referring to the accompanying drawings in which.

DESCRIPTION OF THE INVENTION

Figure 1:
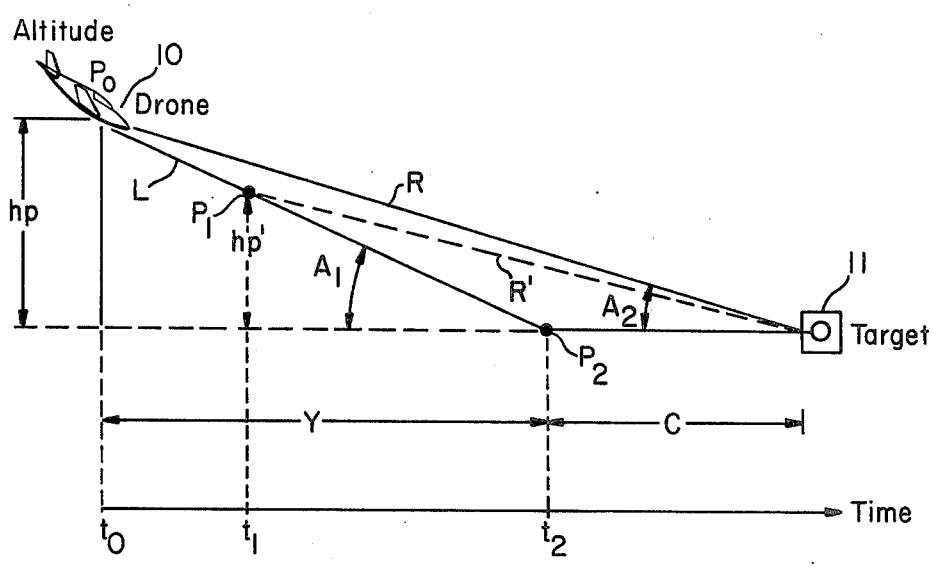
FIG. 1 illustrates two basic types of vertical profile missions for a drone approaching a target wherein the altitude of the drone is plotted as a function of time or horizontal range to the target; and, FIG. 2 is a simplified block diagram of the basic analog components for carrying out the necessary computations to generate the required vertical profile command signal.

Referring first to FIG. 1, there is depicted schematically a drone at 10 at an altitude hp and at a slant range R from a target 11.

Assume first that the vertical mission profile is a decrease in altitude of the drone 10 along a line L to a point P2 constituting a low altitude at which point the drone is to fly horizontally directly to the target 11 over a distance C. It will be appreciated that with this profile, the drone 10 will start at a position $P_0$ and pass along successive points such as P1 on the line L wherein the slant range R will continuously vary with time, the slant range at point P1 being indicated at R'. The point P2 will be defined where the slant range R is equal to the distance C. Thereafter, as stated, the drone will fly horizontally to the target 11 at a low altitude. This first type of mission profile is termed a low altitude approach.

A second type of mission profile would be a straight in or direct approach wherein the drone 10 would simply follow the slant range line R to the target 11.

If Y represents the horizontal distance between the drone 10 when in the position $P_0$ and the point P2, and A1 the angle of approach of the drone to the point P2, then it will be clear that:

$$hp = Y \tan A1$$

for the altitude of the drone 10 at any time along the line L up to the point P2.

For small angles A1 (for example, less than 30°) and in accord with the present invention, an approximation is made in that it is assumed that Y equals approximately R-C. With this assumption, the profile equation becomes:

$$hp \approx (R - C) \tan A1$$

In a second type of mission profile wherein the straight in approach is made, C will equal zero and the profile equation is given by:

$$hp = R \sin A2$$

where A2 is the angle of the line along the slant range.

Figure 2:
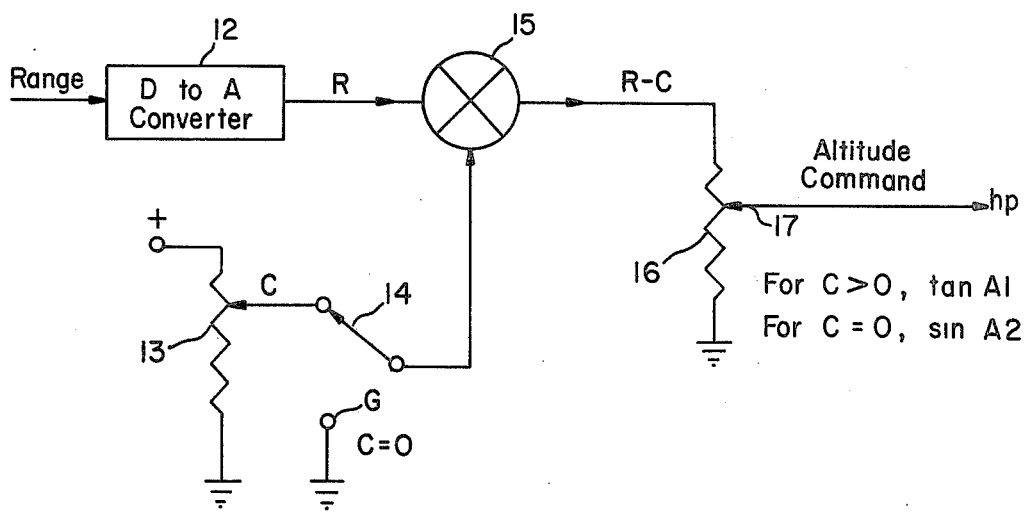

The foregoing equations for the vertical profile altitude command signal can very easily be computed by simple analog components. Thus, by way of example of one such arrangement of components, there is illustrated in FIG. 2 a digital to analog converter 12 connected to receive digital range information from a receiver on the drone. The output of the converter 12 provides the slant range in the form of a varying analog signal.

A first potentiometer 13 in turn includes a variable tap arm 14 for supplying a constant analog signal which is made proportional to the profile mission value C; that is, the horizontal range from the target at which the drone will make a low altitude horizontal approach.

The analog signals for R and C are passed to the inputs of a difference circuit means 15 which provides at its output a difference signal proportional to R-C.

This difference signal is then applied across a second potentiometer 16 and a fraction thereof tapped as by means of an adjustable tap 17 to provide the desired altitude command signal $hp$. The fraction of the signal across the potentiometer 16 in the first mission profile case where C is greater than zero is simply determined by tangent A1 which will be a constant for the specific profile involved.

On the other hand, if a straight in or direct approach to the target is contemplated, C will equal zero by placing the tap 14 in position G and the fraction tapped off by the tap 17 is defined by the sine of the angle A2.

OPERATION

The operation of this invention will be evident from the foregoing description.

If a low altitude approach profile is to be commanded, the distance C is obtained by adjusting the voltage output of the first potentiometer 13, this signal being subtracted from the slant range analog signal provided by the D to A converter 12 as described heretofore.

For the "straight in approach", the switch arm 14 is simply switched to a ground terminal G so that C is essentially zero and the output from the difference circuit means 15 will simply be the slant range. In this latter event, as described, the fraction of the voltage representing the slant range across the potentiometer 16 is defined by the sine of the slant range approach angle A2.

For a maximum angle of 25°, maximum altitude of 15,000 ft., and a value of C of 10 nautical miles, the error of the foregoing approximation is less than 0.9° and reduces to zero as the low altitude point P2 is approached. For longer distances or smaller angles, the approximation is even better.

When the low altitude at point P2 is almost reached, a flare is commanded and the specific low altitude is captured and maintained by use of a radar low altitude control mode. For the straight in approach profile (C=O) the profile height $hp$, is exactly defined by the equation $hp = \sin A2$ The foregoing invention thus provides a great simplification in the computational requirements necessary to compute altitude command as a function of slant range for the low altitude approach mission profile thus avoiding the use of costly computers and the like.

What is claimed is:

1. A method of providing a vertical profile command signal for a drone at a given slant range R from a target wherein the drone is to decrease in altitude and then make a low altitude horizontal approach when the target range reaches a value C, comprising the steps of:
    a. generating a varying analog signal directly proportional to R;
    b. generating a constant analog signal directly proportional to C;
    c. subtracting C from R to provide a difference signal; and,
    d. multiplying said difference signal by a given constant equal to the tangent of the angle of approach of said drone to the point where R=C and by a given constant equal to the sine of the angle of approach of said slant range of said drone to the target when C=O.

2. An altitude control system for generating a vertical profile command signal to control the altitude of a drone at a given slant range R from a target wherein the drone is to decrease in altitude and then make a low altitude horizontal approach when the target range reaches a value C, including, in combination:
    a. a digital to analog converter in said drone connected to receive digital range information and convert the information into a varying analog signal directly proportional to the slant range of said drone from said target;
    b. a first potentiometer adjustable to provide a constant analog signal directly proportional to C;
    c. difference circuit means connected to receive at its inputs said varying analog signal and said constant analog signal and provide at its output an analog output signal directly proportional to R-C; and,
    d. a second potentiometer connected to said output of said difference circuit means including tap means for selecting a fraction of the signal across said second potentiometer to provide said vertical profile command signal, said fraction being defined by the tangent of the angle of approach of said drone to the point where R=C and by the sine of the angle of approach of said slant range of said drone to the target when C=O.

* * * * *